United States Patent
Torikai et al.

(10) Patent No.: US 10,420,152 B2
(45) Date of Patent: Sep. 17, 2019

(54) WIRELESS COMMUNICATION DEVICE, CONTROL METHOD THEREOF, AND WIRELESS COMMUNICATION SYSTEM

(71) Applicant: CANON KABUSHIKI KAISHA, Tokyo (JP)

(72) Inventors: Hiroyuki Torikai, Tokyo (JP); Yuichi Kinoshita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/673,856

(22) Filed: Aug. 10, 2017

(65) Prior Publication Data

US 2018/0063876 A1 Mar. 1, 2018

(30) Foreign Application Priority Data

Aug. 24, 2016 (JP) ................. 2016-164060

(51) Int. Cl.
| | |
|---|---|
| *H04W 76/10* | (2018.01) |
| *H04L 29/06* | (2006.01) |
| *H04W 12/06* | (2009.01) |
| *H04W 60/00* | (2009.01) |
| *H04W 12/00* | (2009.01) |
| *H04L 9/32* | (2006.01) |

(Continued)

(52) U.S. Cl.
CPC ............ *H04W 76/10* (2018.02); *H04L 63/08* (2013.01); *H04W 12/003* (2019.01); *H04W 12/06* (2013.01); *H04W 60/00* (2013.01); *H04L 9/3242* (2013.01); *H04L 63/0428* (2013.01); *H04W 4/80* (2018.02); *H04W 8/005* (2013.01); *H04W 12/00512* (2019.01)

(58) Field of Classification Search
CPC ..... H04L 63/0428; H04L 63/08; H04L 63/20; H04L 63/10; H04L 63/083; H04L 9/3242; H04L 9/3271; H04W 12/06; H04W 12/04; H04W 12/08; H04W 60/00; H04W 76/10; H04W 76/02
See application file for complete search history.

(56) References Cited

U.S. PATENT DOCUMENTS

| | | | |
|---|---|---|---|
| 2005/0257052 A1* | 11/2005 | Asai ................ | H04L 63/105 713/166 |
| 2008/0036879 A1* | 2/2008 | Hashimoto ........ | H04N 5/23203 348/231.99 |

(Continued)

FOREIGN PATENT DOCUMENTS

JP  2016-009986 A  1/2016

OTHER PUBLICATIONS

Copending, unpublished U.S. Appl. No. 15/632,822 to Yuichi Kinoshita, dated Jun. 26, 2017.

*Primary Examiner* — Margaret G Mastrodonato
(74) *Attorney, Agent, or Firm* — Venable LLP

(57) ABSTRACT

If a search signal from an external device received through wireless communication does not include unique information of a searched device, it is determined whether or not the external device has been registered as a communication partner. If it is determined that the external device has been registered as a communication partner, registration of the external device is cancelled. It is possible to detect an inconsistency in the registration state in wireless communication with the external device registered as a communication partner.

14 Claims, 13 Drawing Sheets

(51) Int. Cl.
*H04W 8/00* (2009.01)
*H04W 4/80* (2018.01)

(56) References Cited

U.S. PATENT DOCUMENTS

| | | | |
|---|---|---|---|
| 2008/0076389 A1* | 3/2008 | Lee | H04L 63/0492 455/411 |
| 2013/0095753 A1* | 4/2013 | Chen | H04W 76/10 455/41.1 |
| 2013/0301829 A1* | 11/2013 | Kawamura | H04L 9/0816 380/44 |
| 2016/0157049 A1* | 6/2016 | Choi | H04W 4/008 455/41.2 |
| 2018/0376233 A1* | 12/2018 | Watson | H04W 4/70 |

* cited by examiner

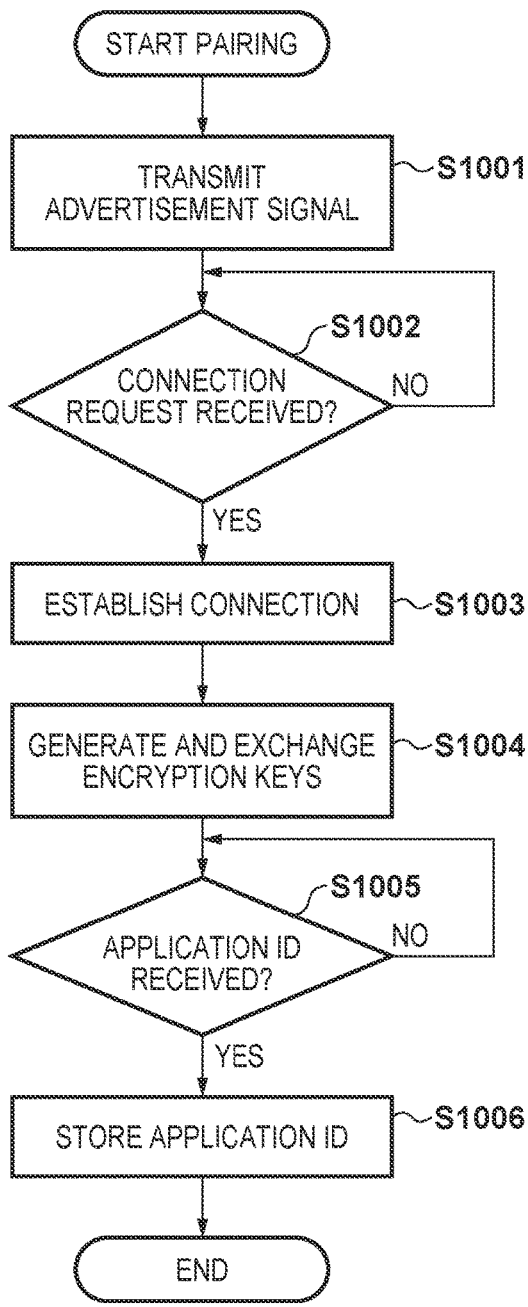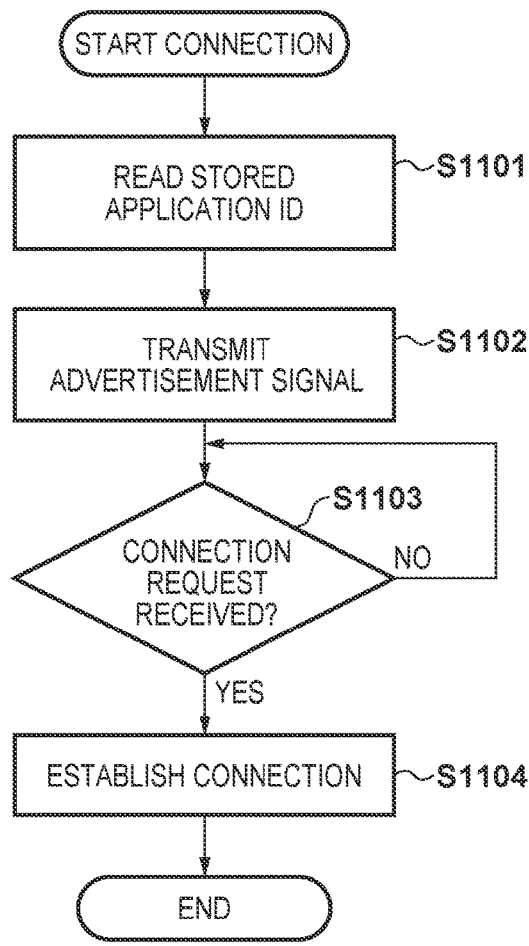

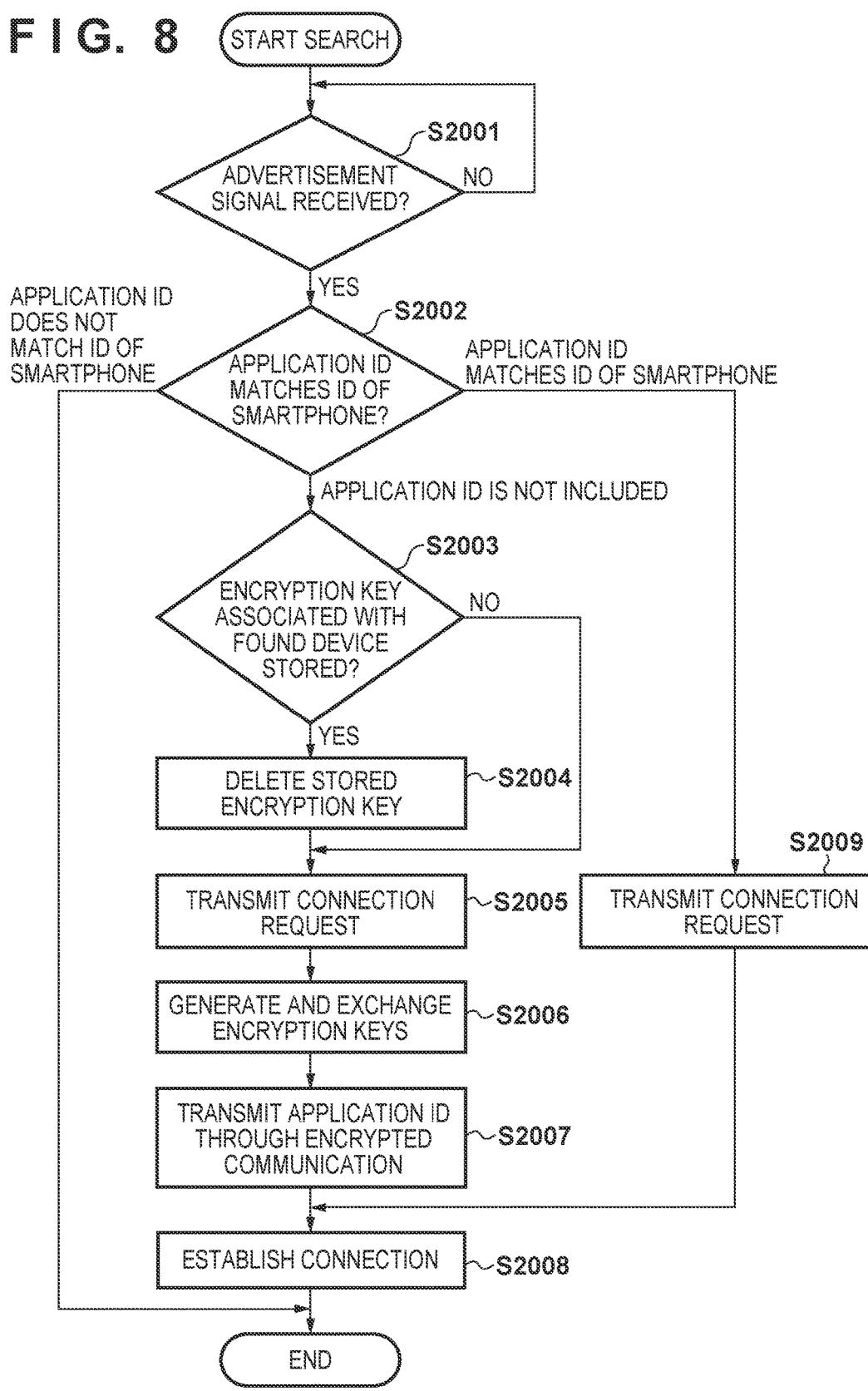

WIRELESS COMMUNICATION DEVICE, CONTROL METHOD THEREOF, AND WIRELESS COMMUNICATION SYSTEM

BACKGROUND OF THE INVENTION

Field of the Invention

The present invention relates to a wireless communication device, a control method thereof, and a wireless communication system.

Description of the Related Art

In recent years, various functions that use wireless communication between electronic devices are implemented. Examples of such functions include a function of transmitting images captured by a digital camera to a smartphone or a tablet terminal so as to browse the images, and a function of remotely controlling a digital camera from a smartphone (Japanese Patent Laid-Open No. 2016-9986).

In order to improve security of communication between electronic devices, there are cases where a registration procedure (also called pairing) is performed when communication is established with a partner device for the first time, the registration procedure being to register the identification information of the partner device and generate an encryption key for use in communication with the partner device. If a registered partner device is present within the communicable range, communication can be established by performing authentication processing or the like by using an encryption key that has been generated in a registration procedure and stored in the device.

However, if one of a pair of mutually registered devices deletes registration information (identification information, an encryption key, and the like) of the partner device, an inconsistency occurs in the registration state between the devices. Specifically, one of the devices identifies its partner device as a registered device, whereas the other device identifies its partner device as an unregistered device.

In this case, it is necessary to delete the registration information registered in the other device and again perform registration processing. However, a conventional wireless communication device merely notifies the user of the occurrence of a communication error. Therefore, the user cannot immediately find out that the communication error is caused by the inconsistency in the registration information.

SUMMARY OF THE INVENTION

The present invention has been made in view of the problem encountered with the conventional technique as described above. The present invention provides a wireless communication device that performs wireless communication with an external device registered as a communication partner, and a method for controlling the wireless communication device, with which an inconsistency in the registration state can be detected.

According to an aspect of the present invention, there is provided a wireless communication device comprising: a determining unit configured to, if a search signal from an external device received through wireless communication does not include unique information of a searched device, determine whether or not the external device has been registered as a communication partner; and a cancellation unit configured to cancel registration of the external device if it is determined that the external device has been registered as a communication partner.

According to another aspect of the present invention, there is provided a wireless communication device comprising: a determining unit configured to, if a search signal from an external device received through wireless communication includes unique information of the wireless communication device, determine whether or not the external device has been registered as a communication partner; and an informing unit configured to prompt a user to again perform processing of registering the external device as a communication partner if it is determined that the external device has not been registered as a communication partner.

According to a further aspect of the present invention, there is provided a wireless communication system comprising: a wireless communication device; and an electronic device configured to transmit the search signal, wherein the wireless communication device comprises: a determining unit configured to, if a search signal from an external device received through wireless communication does not include unique information of a searched device, determine whether or not the external device has been registered as a communication partner; and a cancellation unit configured to cancel registration of the external device if it is determined that the external device has been registered as a communication partner, and wherein the electronic device is configured to, if there is an external device that has been registered as a communication partner, transmit the search signal by incorporating unique information of the external device in the search signal, and if there is no external device that has been registered as a communication partner, transmit the search signal without incorporating the unique information of the external device in the search signal.

According to another aspect of the present invention, there is provided a wireless communication system comprising: a wireless communication device; and an electronic device configured to transmit the search signal, wherein the wireless communication device comprises: a determining unit configured to, if a search signal from an external device received through wireless communication includes unique information of the wireless communication device, determine whether or not the external device has been registered as a communication partner; and an informing unit configured to prompt a user to again perform processing of registering the external device as a communication partner if it is determined that the external device has not been registered as a communication partner, and wherein the electronic device is configured to, if there is an external device that has been registered as a communication partner, transmit the search signal by incorporating unique information of the external device in the search signal, and if there is no external device that has been registered as a communication partner, transmit the search signal without incorporating the unique information of the external device in the search signal.

According to a further aspect of the present invention, there is provided a method for controlling a wireless communication device executed by a control unit included in the wireless communication device, the method comprising: receiving a search signal from an external device received through wireless communication; determining whether or not the search signal includes unique information of a searched device; determining whether or not the external device has been registered as a communication partner if it is determined that the search signal does not include the unique information; and cancelling registration of the external device if it is determined that the external device has been registered as a communication partner.

According to another aspect of the present invention, there is provided a method for controlling a wireless communication device executed by a control unit included in the wireless communication device, the method comprising: determining whether or not a search signal from an external device received through wireless communication includes unique information of the wireless communication device; determining whether or not the external device has been registered as a communication partner if it is determined that the search signal includes the unique information; and prompting a user to again perform processing of registering the external device as a communication partner if it is determined that the external device has not been registered as a communication partner.

According to a further aspect of the present invention, there is provided a non-transitory computer-readable medium storing a program for causing a computer included in a wireless communication device to function as each unit of a wireless communication device comprising: a determining unit configured to, if a search signal from an external device received through wireless communication does not include unique information of a searched device, determine whether or not the external device has been registered as a communication partner; and a cancellation unit configured to cancel registration of the external device if it is determined that the external device has been registered as a communication partner.

According to another aspect of the present invention, there is provided a non-transitory computer-readable medium storing a program for causing a computer included in a wireless communication device to function as each unit of a wireless communication device comprising: a determining unit configured to, if a search signal from an external device received through wireless communication includes unique information of the wireless communication device, determine whether or not the external device has been registered as a communication partner; and an informing unit configured to prompt a user to again perform processing of registering the external device as a communication partner if it is determined that the external device has not been registered as a communication partner.

Further features of the present invention will become apparent from the following description of exemplary embodiments (with reference to the attached drawings).

BRIEF DESCRIPTION OF THE DRAWINGS

FIGS. 7A and 7B are flowcharts illustrating the operations of the digital camera 100 according to the first embodiment.

FIG. 8 is a flowchart illustrating the operations of the smartphone 200 according to the first embodiment.

DESCRIPTION OF THE EMBODIMENTS

Exemplary embodiments of the present invention will now be described in detail in accordance with the accompanying drawings. The embodiments given below will be described by using a wireless communication system in which a digital camera is used as an example of an electronic device according to the present invention and a smartphone is used as an example of an external device. It is noted, however, that the present invention does not necessarily have an image capture function, and the present invention is applicable to any electronic device that has a wireless communication function that uses registration information of a partner device. Examples of such an electronic device include, in addition to a digital camera and a smartphone, a personal computer, a tablet computer, a mobile phone, a media player, a PDA, a game console, a smart watch, and the like. However, the present invention is not limited thereto.

First Embodiment

Configuration of Digital Camera

Figure 1A:
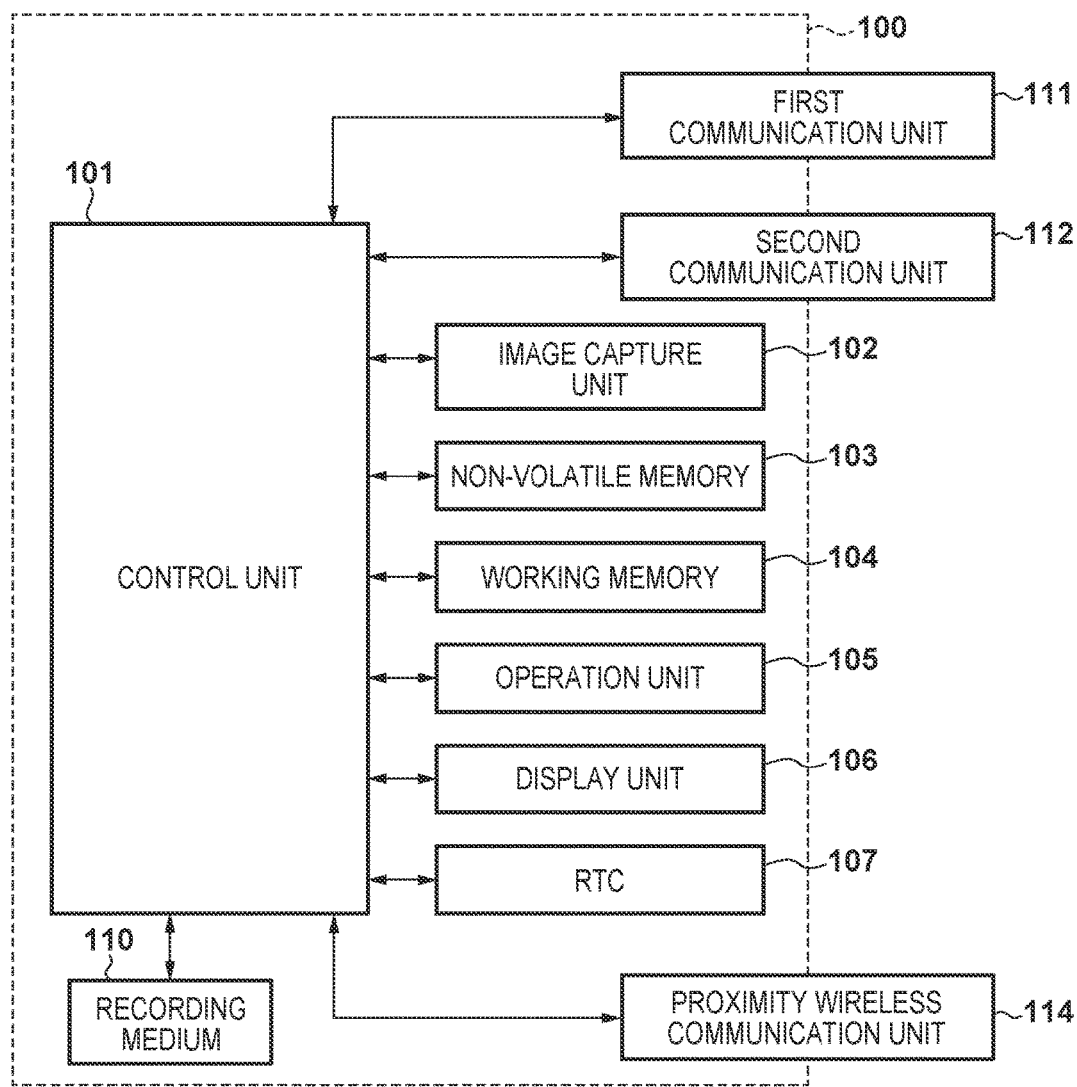
FIGS. 1A to 1C are block diagrams showing an example of a functional configuration of a digital camera 100 according to an embodiment of the present invention.
Figure 1B:
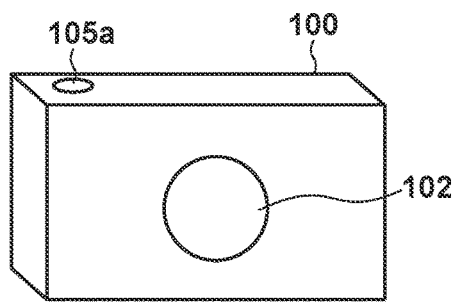
Figure 1C:
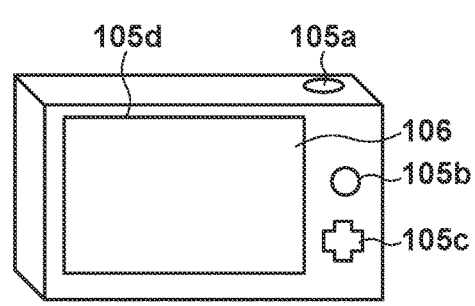

FIGS. 1A to 1C are diagrams showing a digital camera 100 that is an example of an electronic device according to the present embodiment, with FIG. 1A being a block diagram showing an example of a functional configuration, and FIGS. 1B and 1C being perspective views showing an example of an external appearance of the digital camera.

A control unit 101 includes, for example, at least one programmable processor (hereinafter referred to as MPU for the sake of convenience). The control unit 101 implements various functions of the digital camera 100 including a function of performing communication with an external device by causing the MPU to execute a program stored in a non-volatile memory 103 so as to control the constituent elements. The digital camera 100 is not necessarily controlled intensively by the control unit 101, and may be controlled in a distributed manner in cooperation with a processor included in another functional block.

An image capture unit 102 includes, for example, a lens unit including a zoom lens, a focus lens and a diaphragm, a controller (for example, MPU) that controls the operations of the lens unit, an image sensor, and the like. The image sensor is a photoelectric conversion device that converts an optical image formed by the lens unit to a group of electric signals (pixel signals), and in general, a CMOS (complementary metal oxide semiconductor) or a CCD (charge coupled device) image sensor is used. The image capture unit 102 also includes a signal processing circuit for executing A/D conversion, noise reduction processing, and the like, and outputs a group of digital pixel signals (image data). The image data is processed in the same manner as in a commonly used digital camera, and is recorded in a recording medium 110 such as, for example, a memory card, in an image data file format, displayed on a display unit 106, or output to an external device.

The non-volatile memory 103 is, for example, an electrically erasable and recordable memory, and stores therein a program executed by the control unit 101, GUI data, various types of values for settings, registration information (identification information, a communication encryption key, and the like) of an external device, and the like.

A working memory 104 is used as a buffer memory for temporarily storing image data captured by the image capture unit 102, a display memory (VRAM) for the display unit 106, a work area used when the control unit 101 executes a program, and the like.

An operation unit 105 is a group of input devices for the user to input an instruction to the digital camera 100. The operation unit 105 includes, for example, a power button for providing an instruction to turn on or off the digital camera 100, a release switch 105a for providing an instruction to start preparing for image capture and an instruction to start image capture, and a replay button 105b for providing an instruction to replay (display) image data. In FIGS. 1B and 1C, the release switch 105a, the replay button 105b, a directional keypad 105c, and a touch panel 105d that is included in the display unit 106 are input devices included in the operation unit 105.

The release switch 105a includes two switches: a switch SW1 that is turned on when it is half-pressed; and a switch SW2 that is turned on when it is fully pressed. When the switch SW1 is turned on, an instruction to start preparing for image capture is provided, and when the switch SW2 is turned on, an instruction to start image capture is provided. Upon detection of an instruction to start preparing for image capture, the control unit 101 starts preparation for image capture such as AF (auto focus) processing, AE (auto exposure) processing, AWB (auto white balance) processing, and EF (pre-flash) processing. Upon detection of an instruction to start image capture, the control unit 101 starts image capture processing for recording by using the results of processing operations carried out in the preparation for image capture.

The display unit 106 displays a live view image, a recorded image, as well as displaying a screen for interactive operation. The display unit 106 may be an external display apparatus provided outside of the digital camera 100.

An RTC (real time clock) 107 manages an internal clock. The internal clock may be set by the user via the operation unit 105, alternatively, if a receiver for receiving time, a GPS signal, and a standard frequency signal acquired from the outside via first and second communication units 111 and 112 is included, the control unit 101 may set the time obtained from these signals.

The recording medium 110 is, for example, a semiconductor memory, and may be or may not be detachable from the digital camera 100.

The first communication unit 111 and the second communication unit 112 are communication interfaces with an external apparatus, and are each configured to perform communication complying with a different communication standard (protocol). In the present embodiment, the first communication unit 111 and the second communication unit 112 are wireless communication interfaces, each including, for example, an antenna, a modulation and demodulation circuitry, and a communication controller. Here, it is assumed that the first communication unit 111 performs wireless communication complying with IEEE 802.11x, and the second communication unit 112 performs communication complying with Bluetooth (registered trademark) as an example of a wireless communication standard that requires registration of a communication partner, in particular, Bluetooth Version 4.0 or later. It is possible to provide three or more communication units, and it is also possible to provide a communication unit that performs wired communication.

The second communication unit 112 of the digital camera 100 according to the present embodiment is operable in a peripheral mode and a central mode, and the operation mode can be set by the control unit 101. When the second communication unit 112 performs operation in the peripheral mode, the digital camera 100 functions as a client (or slave) device according to the Bluetooth standard, and establishes communication with an external device performing operation in the central mode. When the second communication unit 112 performs operation in the central mode, the digital camera 100 functions as a server (or master) device according to the Bluetooth standard.

A proximity wireless communication unit 114 is a communication interface with an external apparatus, and includes, for example, an antenna, a modulation and demodulation circuitry, and a communication controller. The proximity wireless communication unit 114 performs non-contact proximity communication complying with, for example, an ISO/IEC 18092 standard (so-called NFC: near field communication). The antenna of the proximity wireless communication unit 114 is provided on a side unit of the digital camera 100.

The digital camera 100 can start communication with a smartphone 200 (described later) that is an example of an external device by bringing the proximity wireless communication unit 114 into close proximity to a proximity wireless communication unit 214 close enough to perform communication.

Configuration of Smartphone

Figure 2:
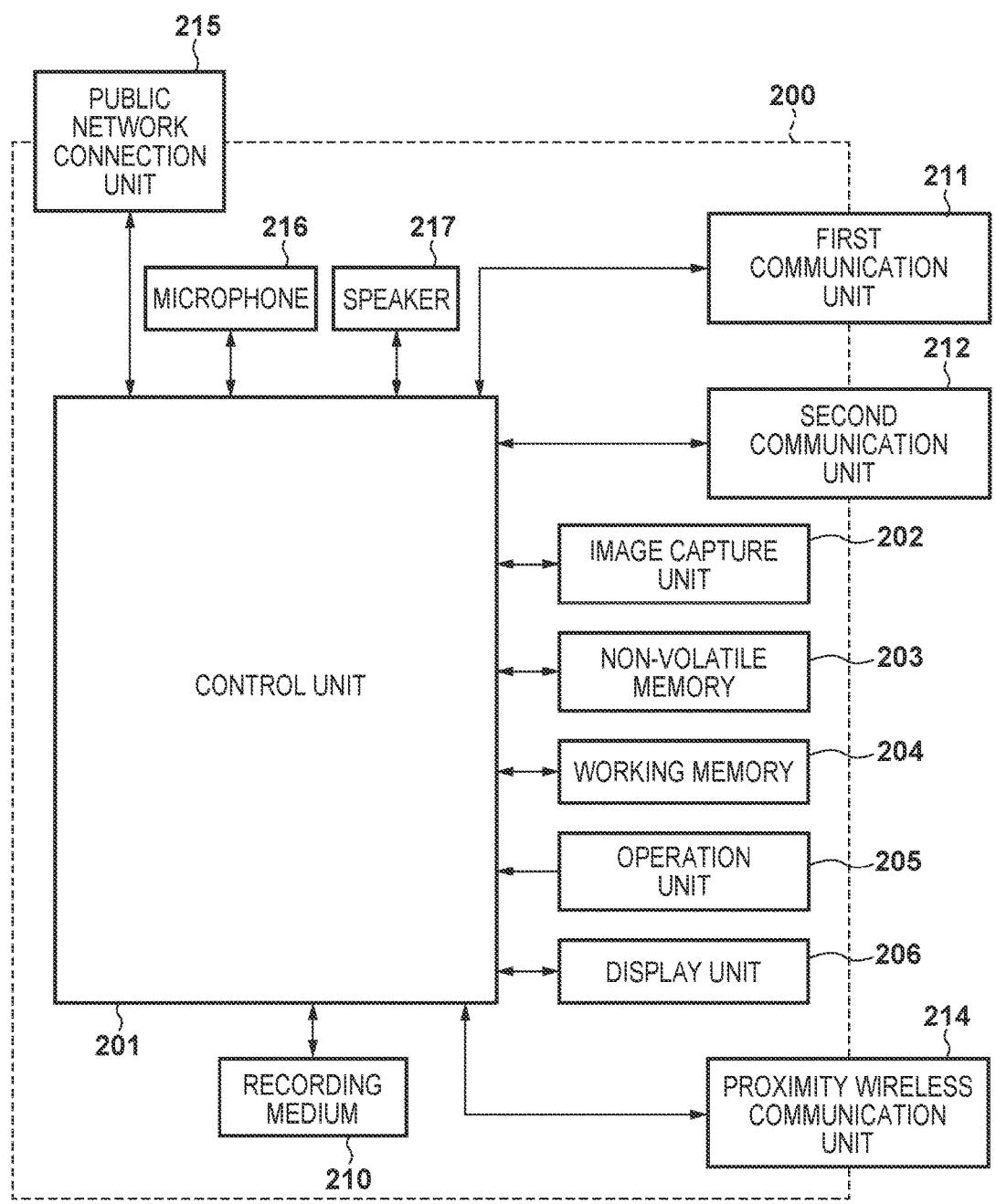
FIG. 2 is a block diagram showing an example of a functional configuration of a smartphone 200 according to an embodiment of the present invention.

FIG. 2 is a block diagram showing an example of a functional configuration of the smartphone 200 that is an example of an electronic device that performs wireless communication with the digital camera 100.

A control unit 201 includes, for example, at least one programmable processor (hereinafter referred to as MPU for the sake of convenience). The control unit 201 implements various functions of the smartphone 200 including a function of performing communication with an external device by causing the MPU to execute a program stored in a non-volatile memory 203 so as to control the constituent elements. The smartphone 200 is not necessarily controlled intensively by the control unit 201, and may be controlled in a distributed manner in cooperation with a processor included in another functional block.

An image capture unit 202 includes, for example, a lens unit including a focus lens and a diaphragm, a controller (for example, MPU) that controls the operations of the lens unit, an image sensor, and the like. The image capture unit 202 also includes a signal processing circuit for executing A/D conversion, noise reduction processing, and the like, and outputs a group of digital pixel signals (image data). The image data is processed by the control unit 201 in the same manner as in a commonly used digital camera, and is recorded in a recording medium 210 such as, for example, a memory card, in an image data file format, displayed on a display unit 206, or output to an external device.

The non-volatile memory 203 stores therein programs (an OS, an application program, and the like) executed by the control unit 201, GUI data, various types of values for settings, information (identification information, a communication encryption key, and the like) regarding an external device that has been registered as a communication partner, and the like. In the present embodiment, it is assumed that the functions related to wireless connection between the digital camera 100 and the smartphone 200 are provided by the OS, and the functions related to communication control that uses wireless connection are provided by an application.

A working memory 204 is used as a display memory (VRAM) for the display unit 206, a work area used when the control unit 201 executes the OS, the application, and the like.

An operation unit 205 is a group of input devices for the user to input an instruction to the smartphone 200. The operation unit 205 includes, for example, a power button for providing an instruction to turn on or off the smartphone 200, a volume control button, a touch panel that is included in the display unit 206, and the like. The operation unit 205 may also include an input device for authentication such as, for example, an iris sensor or a fingerprint sensor.

The display unit 206 is a touch display, and displays a GUI screen provided by the OS as well as displaying various types of information provided by various types of applications.

An RTC 207 manages an internal clock. The internal clock may be set by the user via the operation unit 205, alternatively, if a receiver for receiving time, a GPS signal, and a standard frequency signal acquired from the outside via first and second communication units 211 and 212 is included, the control unit 201 may set the time obtained from these signals.

The recording medium 210 is, for example, a semiconductor memory, and may be or may not be detachable from the smartphone 200. In the recording medium 210, data used by the applications, still images and moving image data captured by the image capture unit 202, data received from an external device, and the like can be recorded.

The first communication unit 211 and the second communication unit 212 are communication interfaces with an external apparatus, and are each configured to perform communication complying with a different communication standard (protocol). In the present embodiment, the first communication unit 211 and the second communication unit 212 are wireless communication interfaces, each including, for example, an antenna, a modulation and demodulation circuitry, and a communication controller. Here, it is assumed that the first communication unit 211 performs wireless communication complying with IEEE 802.11x, and the second communication unit 212 performs communication complying with Bluetooth (registered trademark) as an example of a wireless communication standard that requires registration of a communication partner, in particular, Bluetooth Version 4.0 or later. It is possible to provide three or more communication units, and it is also possible to provide a communication unit that performs wired communication.

As with the second communication unit 112 of the digital camera 100, the second communication unit 212 is operable in a peripheral mode and a central mode in response to an instruction from the control unit 201.

The proximity wireless communication unit 214 is a communication interface with an external apparatus, and includes, for example, an antenna, a modulation and demodulation circuitry, and a communication controller. As with the proximity wireless communication unit 114 of the digital camera 100, the proximity wireless communication unit 214 performs non-contact proximity communication complying with an ISO/IEC 18092 standard.

A public network connection unit 215 is a communication interface for establishing a connection with a public wireless communication network in compliance with a standard such as 3G or LTE (long term evolution) standard.

A microphone 216 and a speaker 217 are audio input and output devices, respectively.

Configuration of Wireless Communication System

Figure 3A:
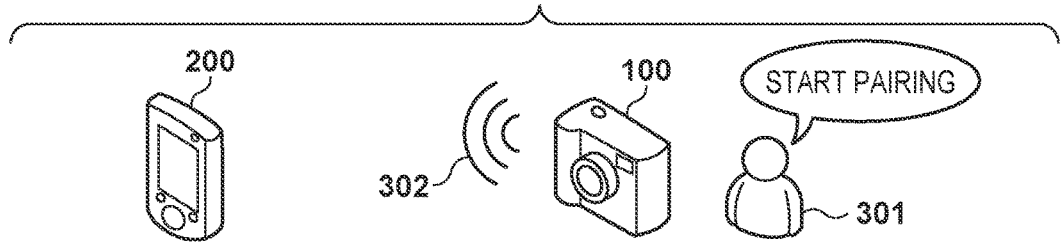
FIGS. 3A to 3C are diagrams schematically showing a pairing procedure between the digital camera 100 and the smartphone 200.
Figure 3B:
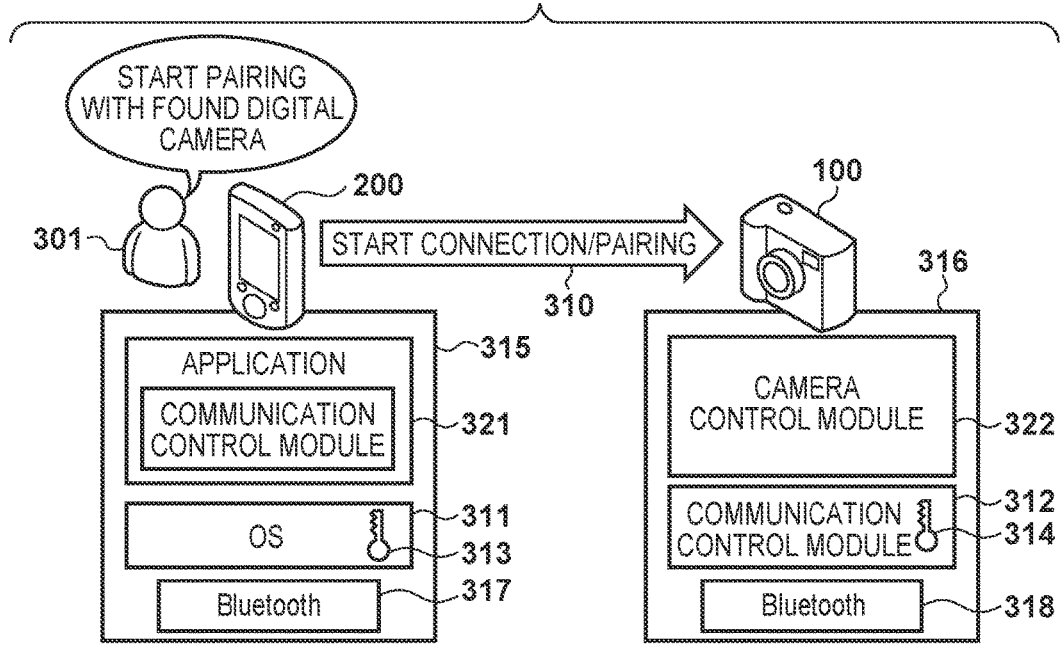
Figure 3C:
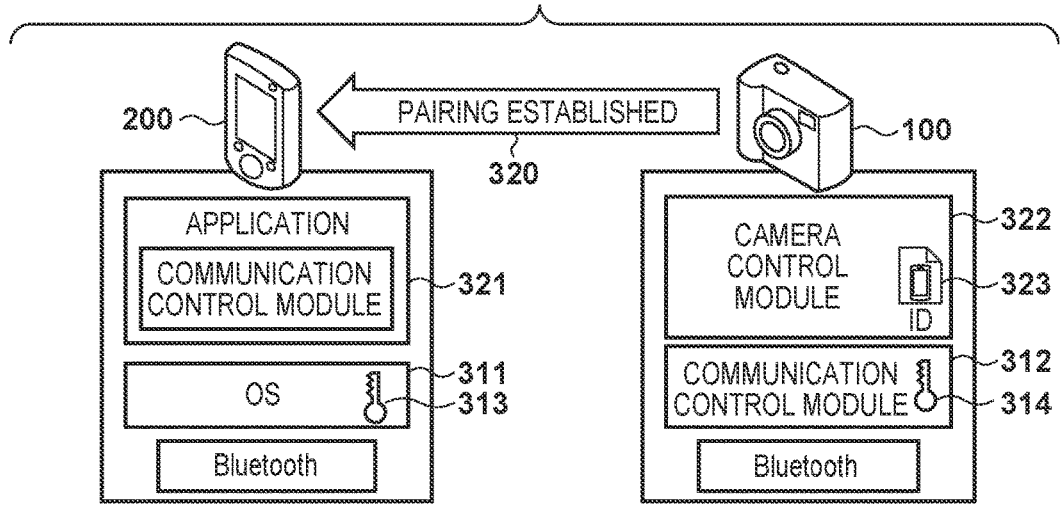

FIGS. 3A to 3C are diagrams schematically showing a procedure and operations of registration processing (pairing) for performing communication via the second communication units 112 and 212 in a wireless communication system including the digital camera 100 and the smartphone 200. Technically speaking, pairing is encryption key generation processing, and the processing of storing a generated encryption key in each device is called bonding, but usually, the entire registration processing including the two processing operations is often called "pairing". For this reason, the entire registration processing will be referred to as "pairing" in this specification. In addition, the completion of registration processing will be referred to as establishment of pairing.

In FIGS. 3A to 3C, a program executed by the control unit 101 and a program executed by the control unit 201 so as to allow the digital camera 100 and the smartphone 200 to perform communication via the second communication units 112 and 212 are schematically shown in a module configuration. A program module 316 includes a Bluetooth module 318 for establishing a connection complying with a Bluetooth standard via the second communication unit 112, a communication control module 312 for performing communication control on the established connection, and a camera control module 322. A program module 315 includes a Bluetooth module 317 for establishing a connection complying with a Bluetooth standard via the second communication unit 212, an OS 311, and an application 321 that provides a specific function via communication on the established connection. In the smartphone 200, the application 321 that provides functions that use communication with the digital camera 100 (for example, viewing an image stored in the digital camera 100, and transferring data) functions as a communication control module. In the present embodiment, the digital camera 100 does not include an OS, but may be configured to have a program module configuration as in the smartphone.

Pairing starts in response to, for example, an instruction to start pairing that is provided from a user 301 on a menu screen via the operation unit 105 of the digital camera 100. Upon detection of the instruction to start pairing, the control unit 101 (the Bluetooth module 318) causes the second communication unit 112 to broadcast an advertisement signal 302 (FIG. 3A). The advertisement signal is a search signal for searching for a device that is present in the communication coverage range, and includes information of the transmission source device (here, the digital camera 100). In the case of searching for a specific device, the advertisement signal may include unique information of the searched device (here, the smartphone 200). In the present embodiment, as an example of the unique information of the smartphone 200, the identification information (application ID) of an application running in the smartphone 200 stored in the digital camera 100 during pairing processing with the smartphone 200 is used.

Upon reception of the advertisement signal by the second communication unit 212, the control unit 201 (the Bluetooth module 317) of the smartphone 200 acquires the information of the digital camera 100 from the advertisement signal. Then, the control unit 201 (the OS 311) causes the display unit 206 to display a screen for notifying the fact that a digital camera has been detected and inquiring whether or not to start pairing with the digital camera.

Upon detection of an instruction to start pairing with the digital camera 100 via, for example, the operation unit 205, the control unit 201 (the OS 311) causes the second communication unit 212 to transmit a connection request signal 310 to the digital camera 100 via the Bluetooth module 317.

Upon reception of the connection request by the second communication unit 112, a connection is established between the second communication unit 112 and the second communication unit 212. When the connection has been established, the control unit 201 (the Bluetooth module 317) causes the second communication unit 212 to transmit a pairing request signal 310 to the digital camera 100.

The control unit 101 (the Bluetooth module 318) receives the pairing request via the second communication unit 112. In response thereto, processing of generating and exchanging keys is performed between the control unit 101 (the Bluetooth module 318) and the control unit 201 (the Bluetooth module 318) via the second communication unit 112 and the second communication unit 212. The keys are used in authentication processing performed after a connection has been established, as well as encrypted communication performed after authentication processing, and the like, and are stored and managed together with the identification information of the partner device in each device. Hereinafter, for the sake of convenience, the keys will be referred to as "encryption keys".

The storage locations for storing the encryption keys are different in the digital camera 100 and the smartphone 200. In the digital camera 100, an encryption key 314 is stored in the communication control module 312, and in the smartphone 200, an encryption key 313 is stored in the OS 311. When the encryption key 313 is stored in the OS 311, the control unit 201 (the OS 311 and the application 321) can perform encrypted communication on the Bluetooth connection with the digital camera 100.

Next, the control unit 201 (the application 321) transmits its ID (application ID) 323 to the digital camera 100 through encrypted communication (FIG. 3C). The application ID is an example of unique information uniquely assigned to an application, and by designating the application ID and performing communication, it is possible to establish communication with a specific application. Upon receiving the ID 323, the control unit 101 (the Bluetooth module 318) stores the ID 323 in the camera control module 322 that can exchange data with the application 321. As a result, pairing between the digital camera 100 and the smartphone 200 is established (320).

Figure 4A:
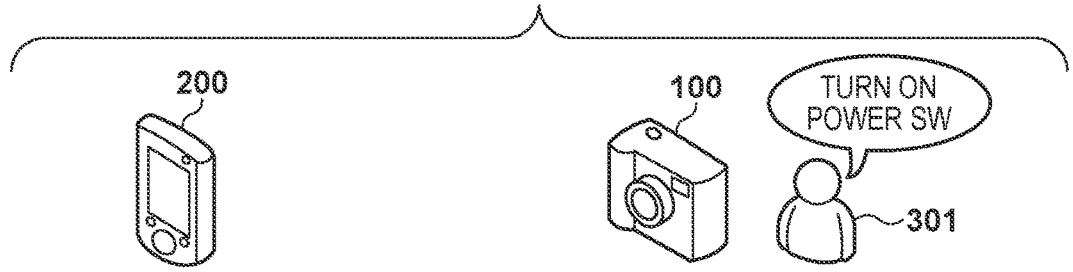
FIGS. 4A to 4C are diagrams schematically showing a connection procedure between the digital camera 100 and the smartphone 200 after pairing has been established.
Figure 4B:
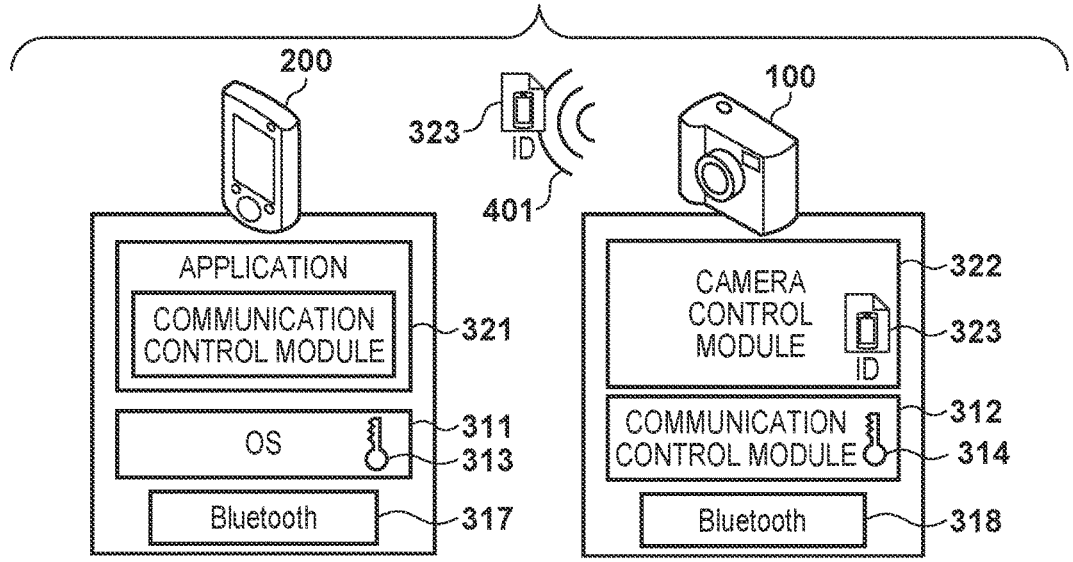
Figure 4C:
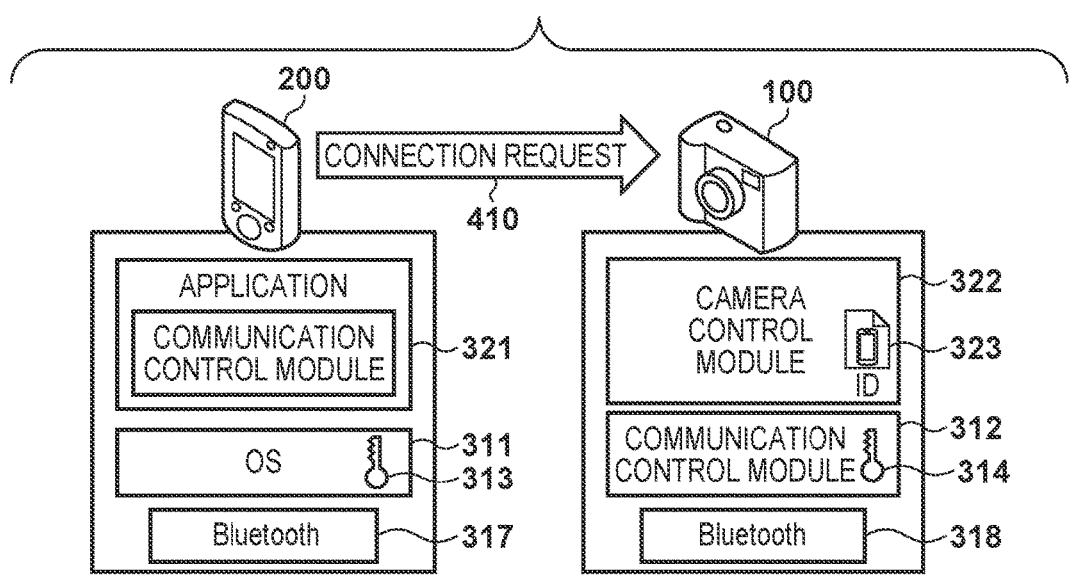

Next, a procedure and operations of establishing reconnection between the digital camera 100 and the smartphone 200 that have already been paired with the digital camera 100 via the second communication units 112 and 212 will be described with reference to FIGS. 4A to 4C.

In the present embodiment, it is assumed that the control unit 101 (the Bluetooth module 318) is configured so as to, in response to the power switch of the operation unit 105 being turned on (FIG. 4A), cause the second communication unit 112 to start broadcasting an advertisement signal 401. The control unit 101 (the Bluetooth module 318) may be configured so as to, when the battery voltage is a predetermined value or more and the digital camera is not connected to a device, cause the second communication unit 112 to broadcast the advertisement signal 401 irrespective of the state of the power switch.

In the case of establishing a reconnection with a device that has already been paired, the control unit 101 (the Bluetooth module 318) incorporates, in the advertisement signal 401, the information of the device with which a reconnection is to be established. Here, in order to establish a reconnection with the smartphone 200, the ID 323 of the application 321 installed in the smartphone 200, the ID being stored in the camera control module 322, is incorporated in the advertisement signal 401 (FIG. 4B).

If the smartphone 200 is present within the communication coverage range of the second communication unit 112, the control unit 201 (the Bluetooth module 317) receives the advertisement signal 401 via the second communication unit 212. The control unit 201 (the OS 311) detects that the received advertisement signal 401 includes the ID 323 of the application 321, and recognizes that the advertisement signal 401 is a signal for searching for the smartphone 200.

The control unit 201 (the OS 311 and the Bluetooth module 317) transmits a connection request signal 410 to the digital camera 100 via the second communication unit 212. As a result, a connection is established (re-established) between the second communication units 112 and 212 (FIG. 4C).

Next, a problem that occurs when the registration information of the smartphone 200 that has been paired is deleted in the digital camera 100 will be described with reference to FIGS. 5A to 5C.

Figure 5A:
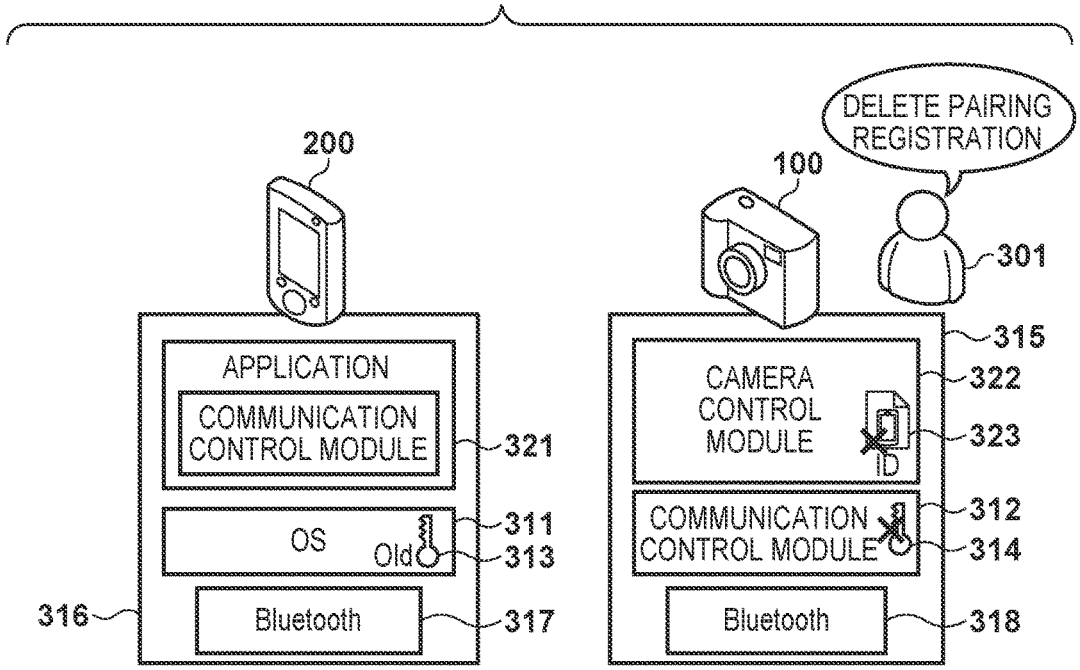
FIGS. 5A to 5C are diagrams schematically illustrating a problem that occurs when pairing with the smartphone 200 is cancelled in the digital camera 100 after pairing has been established.

FIG. 5A schematically shows an example in which the control unit 101 deletes the registration information (the encryption key 314 and the ID 323 of the application 321) of the smartphone 200 in a state in which pairing is established as shown in FIG. 3C. The deletion of the registration information can be executed in response to, for example, the control unit 101 detecting an instruction to cancel the pairing with the smartphone 200 received via the operation unit 105.

The deletion of the registration information of the paired device (the cancellation of pairing with the paired device) in the digital camera 100 can be executed even in a state in which communication with the paired device (here, the smartphone 200) is not established. Accordingly, a situation may occur in which despite the fact that the smartphone 200 is not registered as a paired device in the digital camera 100, the digital camera 100 is registered as a paired device (the registration information is stored) in the smartphone 200. If an inconsistency occurs in the pairing state between the devices as described above, the following problem occurs in the subsequent communication.

Figure 5B:
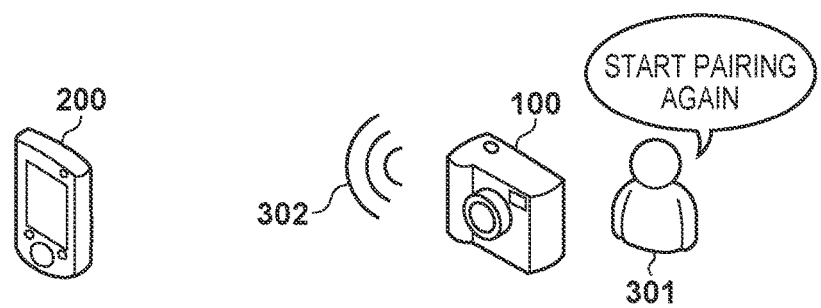
Figure 5C:
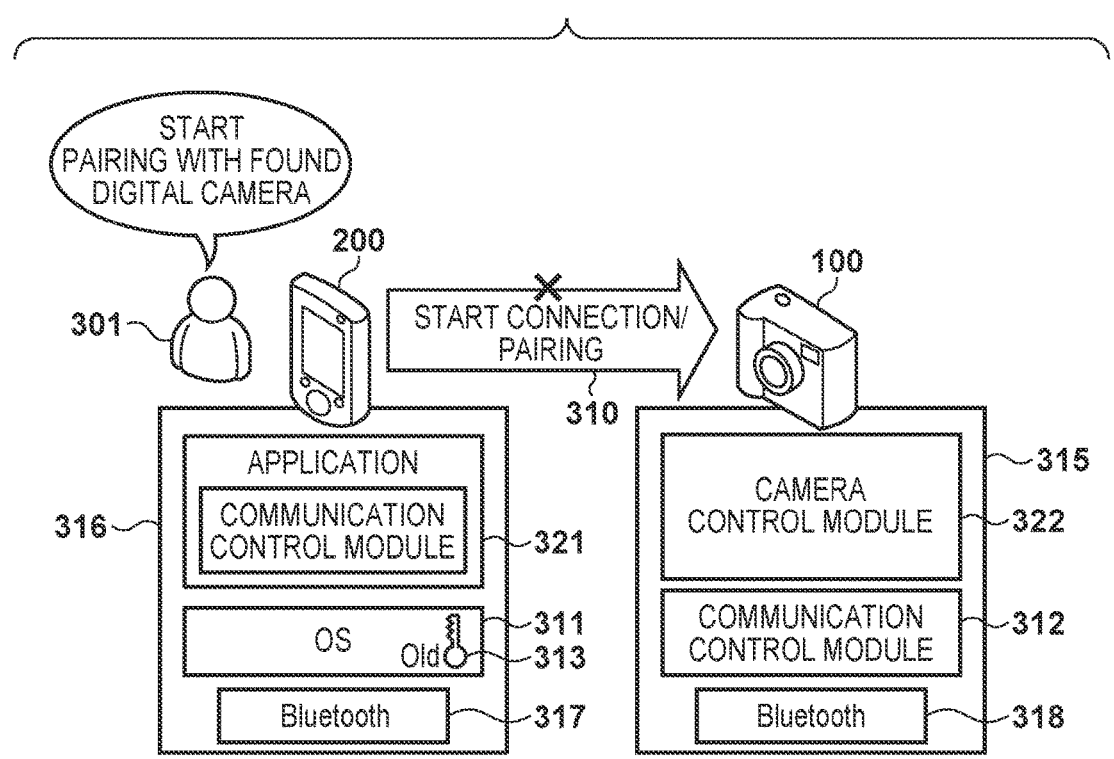

For example, it is assumed that, as shown in FIG. 5B, the digital camera 100 cancels the pairing with the smartphone 200, and thereafter again tries to execute pairing with the smartphone 200 in the same manner. In this case, as described with reference to FIG. 3A, an advertisement signal 302 that does not include the ID 323 is broadcast from the digital camera 100.

Because the advertisement signal 302 includes the unique information of the digital camera 100, the smartphone 200 that has received the advertisement signal 302 recognizes that the advertisement signal has been received from the paired device, and establishes a connection between the second communication units 212 and 112. However, even if an attempt is made to execute encrypted communication on the established connection by using the encryption key 313 stored in the OS 311, because there is no encryption key in the digital camera 100, encrypted communication is not performed normally. As a result, it is not possible to register the smartphone 200 again in the digital camera 100 (FIG. 5C). In this case, the user has to cancel the pairing with the digital camera 100 in the smartphone 200, and then again perform pairing processing in the digital camera 100, which is troublesome for the user. Also, the user cannot be aware of the fact that an inconsistency has occurred in the pairing state until establishment of encrypted communication fails, which may cause the user to feel inconvenient when he/she wants to perform communication where necessary. A situation may also occur in which the user cannot find out that the failure of pairing is caused by the inconsistency in the pairing state.

Figure 6A:
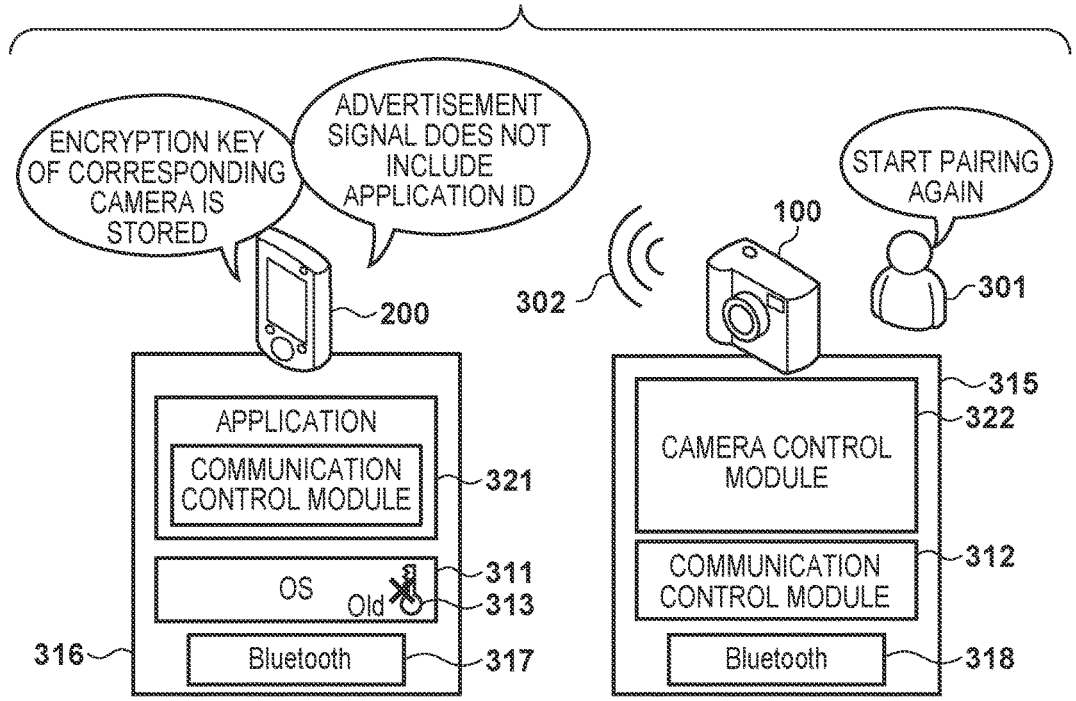
FIGS. 6A and 6B are diagrams schematically showing a procedure for detecting an inconsistency in the registration state according to a first embodiment.

The problem described with reference to FIGS. 5A to 5C can be suppressed by detecting the inconsistency in the pairing state. For example, as shown in FIG. 6A, when the smartphone 200 receives the advertisement signal 302, if it is determined that the advertisement signal 302 does not include the unique information of the smartphone 200 and that the transmission source from which the advertisement signal 302 was transmitted is a paired device (the registration information of the transmission source from which the advertisement signal 302 was transmitted is stored in the OS 311), it is possible to determine that an inconsistency has occurred in the pairing state with the transmission source device from which the advertisement signal 302 was transmitted.

This is because the advertisement signal 302 includes the unique information of the smartphone 200 (here, the ID 323 of the application 321) if the smartphone 200 is identified as a paired device by the transmission source from which the advertisement signal 302 was transmitted. Accordingly, the control unit 201 (the application 321) performs the above-described determination upon receiving the advertisement signal. Then, if it is determined that an inconsistency has occurred in the pairing state with the transmission source device from which the advertisement signal 302 was transmitted, the control unit 201 (the application 321) invalidates the registration information (here, the encryption key 313) of the transmission source device from which the advertisement signal 302 was transmitted.

When the registration information of the transmission source device from which the advertisement signal 302 was transmitted stored in the OS 311 is invalidated, the control unit 201 (the application 321) deletes the registration information. In the case where the application 321 is not permitted to delete the registration information registered in the OS 311, the control unit 201 (the application 321) causes the display unit 206 to display a message requesting the user to cancel the pairing with the digital camera 100.

Figure 6B:
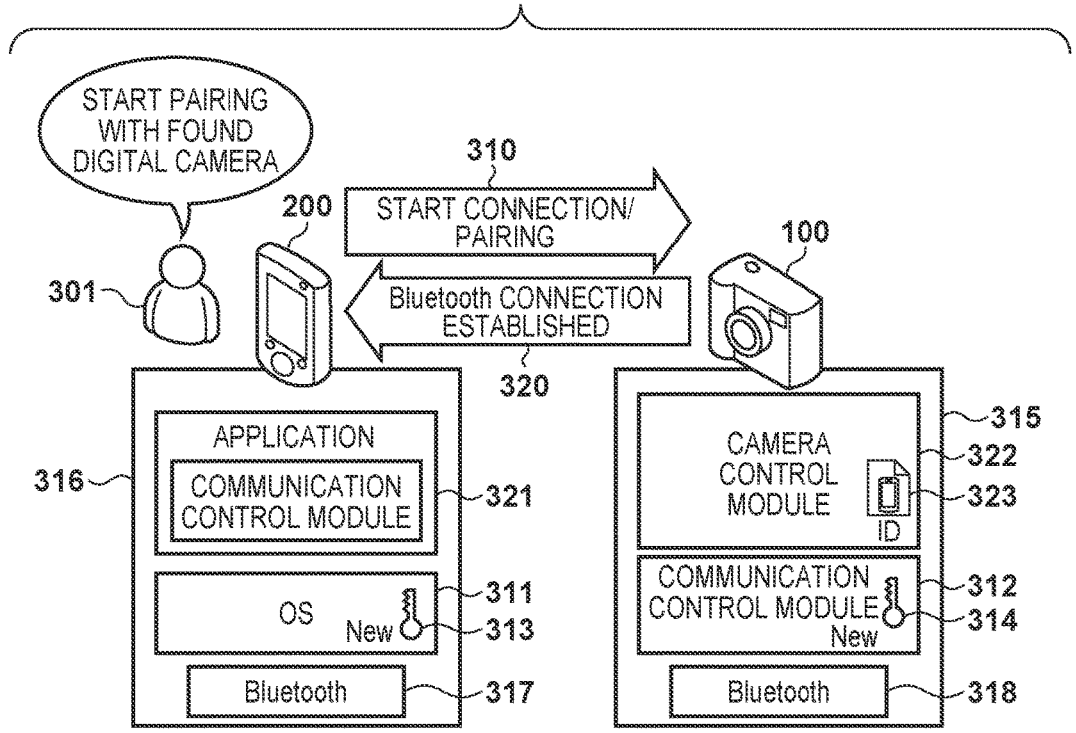

After the cancellation of the registration information of the digital camera 100 has been confirmed, the control unit 201 (the application 321) causes the display unit 206 to display a message requesting the user to execute pairing processing again. When the user executes pairing processing in the digital camera 100 in accordance with the message, pairing processing as described with reference to FIGS. 3A to 3C is executed, and pairing between the digital camera 100 and the smartphone 200 is established again (FIG. 6B).

Flowchart of Connection Processing of Digital Camera 100

Next, the operations of the digital camera 100 described above will be described more specifically.

FIG. 7A is a flowchart illustrating the operations of registration processing (pairing processing) for registering the partner device, which is performed by the digital camera 100.

In step S1001, the control unit 101 (the Bluetooth module 318) causes the second communication unit 112 to broadcast an advertisement signal. The advertisement signal includes the device name, the device unique information (for example, ID), and the service ID of the digital camera 100. The smartphone 200 can determine, based on the content of the advertisement signal, whether or not the transmission source device is an available device.

In step S1002, the control unit 101 (the Bluetooth module 318) waits for a connection request signal to be received from a device (here, the smartphone 200) that is present in the reception coverage range where reception of the advertisement signal is possible. Upon receiving a connection request signal, in step S1003, the control unit 101 (the Bluetooth module 318) executes a procedure complying with a communication standard (here, Bluetooth) between the second communication units 112 and 212, and thereby establishes a wireless connection.

In step S1004, the control unit 101 (the Bluetooth module 318) executes processing of generating and exchanging encryption keys 313 and 314 with the control unit 201 (the Bluetooth module 317), and stores the encryption keys 313 and 314.

In step S1005, the control unit 101 (the Bluetooth module 318) waits for the ID 323 of the application 321 to be received from the smartphone 200 through encrypted communication. Upon receiving the ID 323, in step S1006, the control unit 101 (the Bluetooth module 318) stores the ID 323 in the camera control module 322.

Through the processing described above, pairing is established between the digital camera 100 and the smartphone 200.

FIG. 7B is a flowchart illustrating the operations for connecting the digital camera 100 to the smartphone 200 that has been paired, which is performed by the digital camera 100.

In step S1101, the control unit 101 (the Bluetooth module 318) reads the ID 323 stored in the camera control module 322 into, for example, the working memory 104. In the case where there are a plurality paired devices, the control unit 101 can prompt the user to select one device, and read the ID of the selected device.

In step S1102, the control unit 101 (the Bluetooth module 318) causes the second communication unit 112 to broadcast an advertisement signal including the ID 323. If the smartphone 200 detects that the advertisement signal includes the ID 323 of the application 321 installed in the smartphone 200, the smartphone 200 transmits a connection request signal to the digital camera 100 that is the transmission source from which the advertisement signal was transmitted.

In step S1103, the control unit 101 (the Bluetooth module 318) waits for a connection request signal provided in response to the advertisement signal broadcast in step S1102 to be received from the smartphone 200. Upon receiving the connection request signal, in step S1104, the control unit 101 (the Bluetooth module 318) establishes a connection between the second communication units 112 and 212.

Through the processing described above, the digital camera 100 is connected to the smartphone 200 that has been paired with the digital camera 100.

Flowchart of Connection Processing of Smartphone 200

FIG. 8 is a flowchart illustrating connection processing of the smartphone 200 according to the present embodiment.

Here, it is assumed that the smartphone 200 receives a pairing request and a connection request from a device while the application 321 is running in the smartphone 200 (in the foreground or the background).

In step S2001, the control unit 201 (the Bluetooth module 317) waits for an advertisement signal from the digital camera 100 to be received by the second communication unit 212, and causes the processing to proceed to step S2002 upon receiving the advertisement signal.

In step S2002, the control unit 201 (the Bluetooth module 317) determines whether or not the advertisement signal received in step S2001 includes an application ID, and if it is determined that the advertisement signal includes an application ID, the control unit 201 determines whether or not the application ID matches the ID 323 of the application 321 installed in the smartphone 200.

If it is determined that the advertisement signal does not include the ID 323, the control unit 201 (the Bluetooth module 317) determines that the transmission source device (the digital camera 100) from which the advertisement signal was transmitted is currently executing pairing processing, and causes the processing to proceed to step S2003. The control unit 201 (the Bluetooth module 317) may also determine that the advertisement signal does not include the ID if the advertisement signal includes a value that is invalid as an application ID.

If it is determined that the advertisement signal includes an ID different from the ID 323, the control unit 201 (the Bluetooth module 317) determines that the advertisement signal is an advertisement signal for searching for another device, and ends the processing with respect to the received advertisement signal.

If it is determined that the advertisement signal includes the ID 323, the control unit 201 (the Bluetooth module 317) interprets the advertisement signal as a searching (connection) request for the smartphone 200. Then, in step S2009, the control unit 201 (the Bluetooth module 317) causes the second communication unit 212 to transmit a connection request signal to the digital camera 100, and thereafter causes the processing to proceed to step S2008.

Next, processing in step S2003 and the subsequent steps will be described.

In step S2003, the control unit 201 (the application 321) confirms (inquires) whether the encryption key 313 associated with the transmission source (here, the digital camera 100) from which the advertisement signal was transmitted is stored as the data of the OS 311. If it is determined that the encryption key 313 is stored, the control unit 201 (the application 321) causes the processing to proceed to step S2004, and otherwise causes the processing to proceed to step S2005.

Figure 9A:
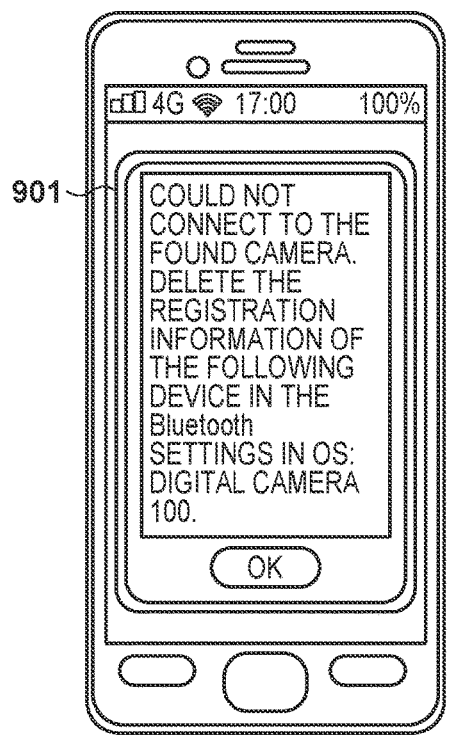
FIGS. 9A to 9D are diagrams showing examples of screen displays on the smartphone 200 according to the first embodiment.

In step S2004, the control unit 201 (the application 321) deletes the encryption key 313 stored as the data of the OS 311 (cancels the pairing with the digital camera 100). In the case where it is not possible to delete the data of the OS 311 from the application 321, or where the deletion processing ended abnormally, the control unit 201 (the application 321) may display, for example, a message screen 901 as shown in FIG. 9A so as to request the user to delete the encryption key 313.

Figure 9B:
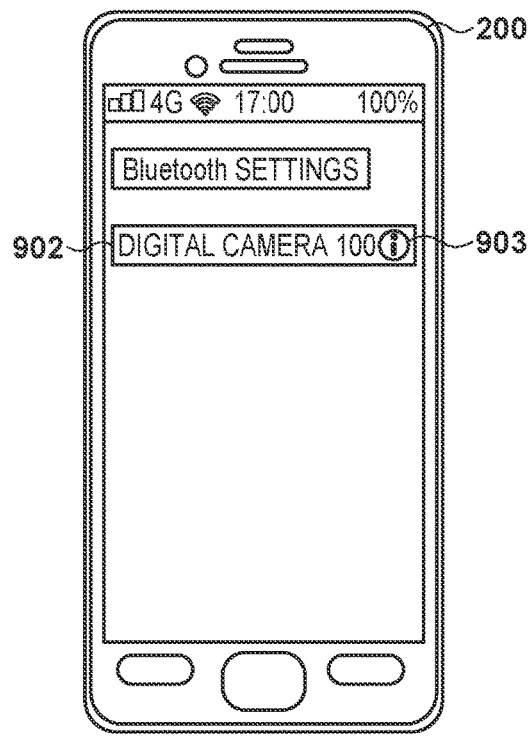
Figure 9C:
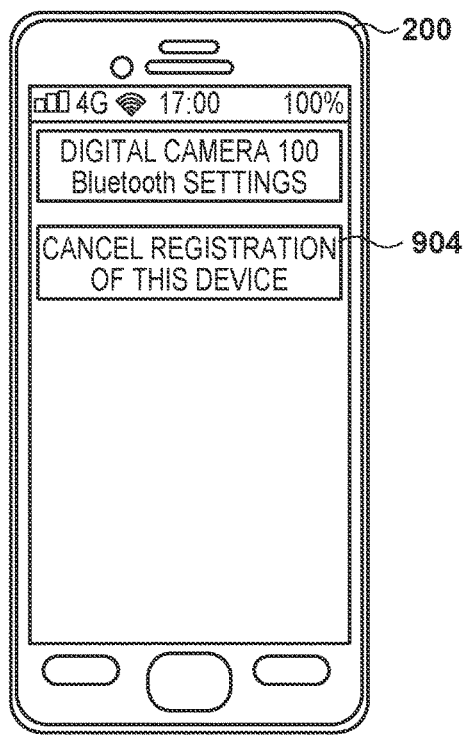

FIG. 9B shows an example of a Bluetooth settings screen provided by the OS 311 of the smartphone 200. On the settings screen, a list of paired devices is displayed (here, for the sake of convenience, only the digital camera 100 is listed as a paired device). For each paired device, its name 902 and corresponding information display icon 903 are displayed. If the information display icon 903 is selected or tapped, the control unit 201 (the OS 311) displays an individual screen for the corresponding device as shown in FIG. 9C. On the individual screen, a pairing cancel button 904 is provided, and if the pairing cancel button is selected or tapped, the control unit 201 (the OS 311) deletes the registration information (here, the encryption key 313) of the device displayed on the individual screen, and cancels the pairing.

After the deletion of the encryption key 313 has been confirmed, the control unit 201 (the application 321) causes the processing to proceed to step S2005.

In step S2005, as described with reference to FIG. 3B, the control unit 201 (the Bluetooth module 317) causes the second communication unit 212 to transmit a connection request signal 310 to the digital camera 100.

Then, a connection is established between the second communication unit 112 and the second communication unit 212. After the connection has been established, in step S2006, the control unit 201 (the Bluetooth module 317) causes the second communication unit 212 to transmit a pairing request signal 310 to the digital camera 100. Then, processing of generating and exchanging keys is performed via the second communication unit 112 and the second communication unit 212.

In step S2007, the control unit 201 (the application 321) transmits its ID (application ID) to the digital camera 100 through encrypted communication.

Through the processing as described above, even if the pairing with the smartphone 200 is cancelled in the digital camera 100 that is managed as a paired device in the smartphone 200, re-pairing processing is performed appropriately.

As described above, according to the present embodiment, it is possible to detect an inconsistency in the registration state between the transmission source device from which the advertisement signal was transmitted and the smartphone 200 based on the content of the received advertisement signal and the stored information of the transmission source device from which the advertisement signal was transmitted. Accordingly, it is possible to avoid a communication failure and a failure in re-registration processing caused by the inconsistency in the registration state.

Second Embodiment

In the first embodiment, a method was described that detects an inconsistency in the registration state caused as a result of pairing being cancelled in the advertisement signal transmitting device (the digital camera 100). In the present embodiment, a method will be described that detects an inconsistency in the registration state caused as a result of pairing being cancelled in the advertisement signal receiving device (the smartphone 200).

Figure 10A:
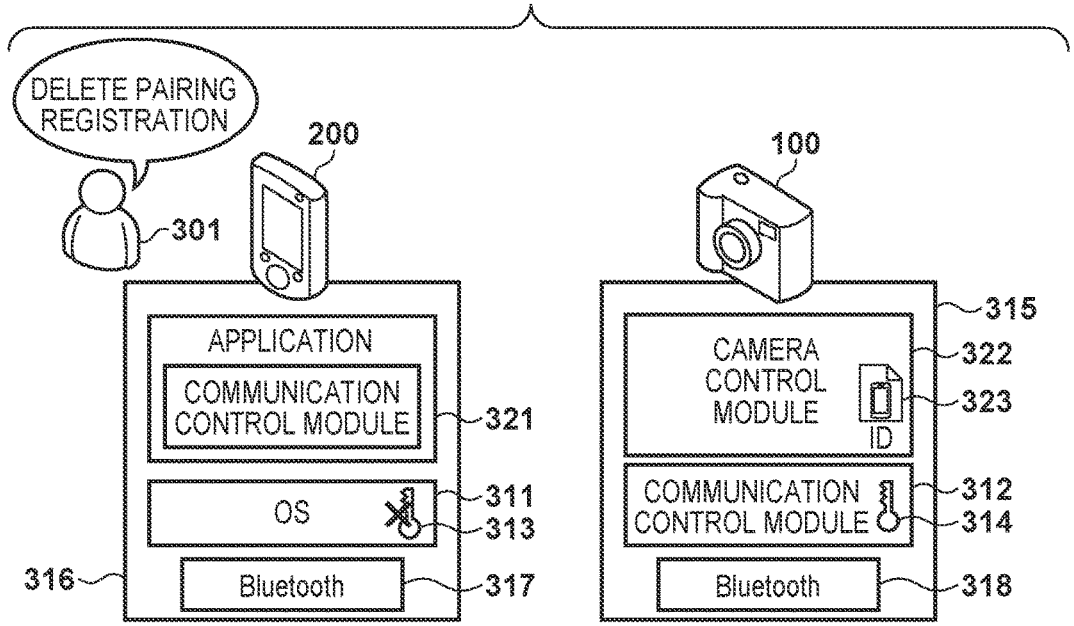
FIGS. 10A to 10C are diagrams schematically illustrating a problem that occurs when pairing with the digital camera 100 is cancelled in the smartphone 200 after pairing has been established.

FIG. 10A schematically shows a state in which pairing with the digital camera 100 is cancelled in the smartphone 200, but pairing with the smartphone 200 is not cancelled in the digital camera 100. This is a state in which the key 313 is not stored as the data of the OS 311 of the smartphone 200, but the ID 323 of the application 321 is stored in the camera control module 322 of the digital camera 100. Such a state can occur, for example, when the pairing with the digital camera 100 is cancelled on the individual screen as shown in FIG. 9C, or when the wireless settings of the OS 311 are initialized.

Figure 10B:
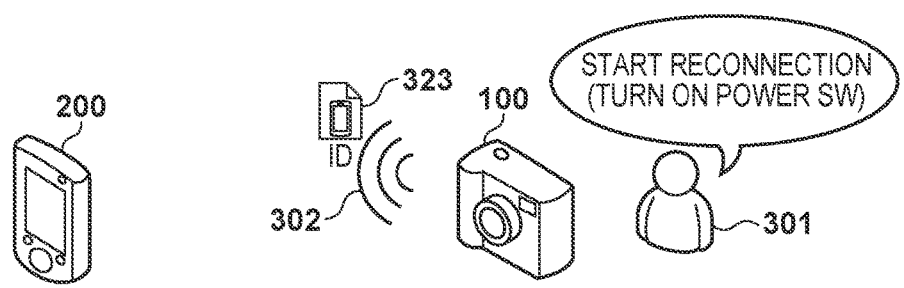

In this state, encrypted communication between the digital camera 100 and the smartphone 200 fails. However, because the user 301 of the digital camera 100 regards the smartphone 200 as a paired device, for example, as shown in FIG. 10B, the user tries to again establish a connection by turning the power switch of the digital camera 100 on again, or the like. In response thereto, an advertisement signal 302 including the ID 323 of the application 321 is transmitted from the digital camera 100.

Figure 10C:
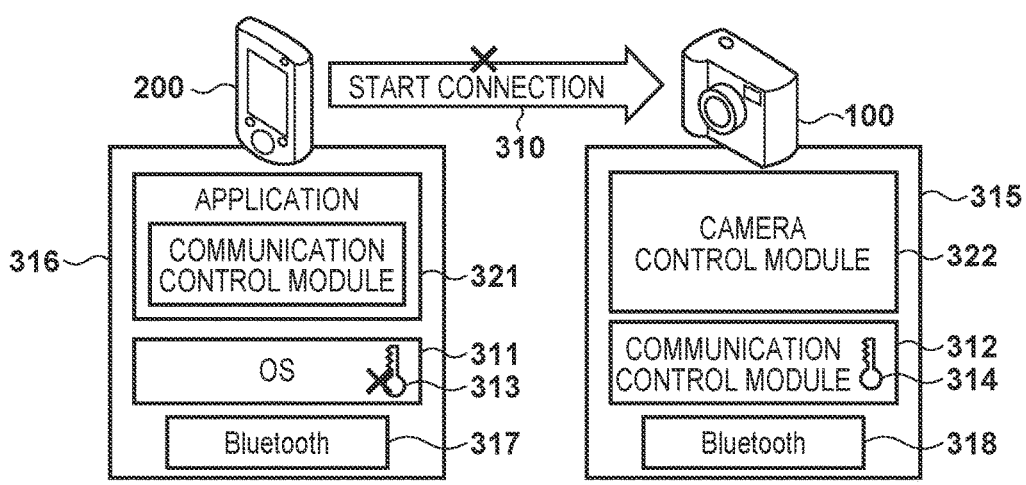

The smartphone 200 that has received the advertisement signal 302 detects the ID 323 of the application 321 installed in the smartphone 200, and transmits a connection request signal 310, as a result of which a connection is established via the second communication units 112 and 212. However, because the key 313 has already been deleted from the OS 311 of the smartphone 200, authentication processing fails, and thus encrypted communication cannot be established (FIG. 10C).

Figure 11A:
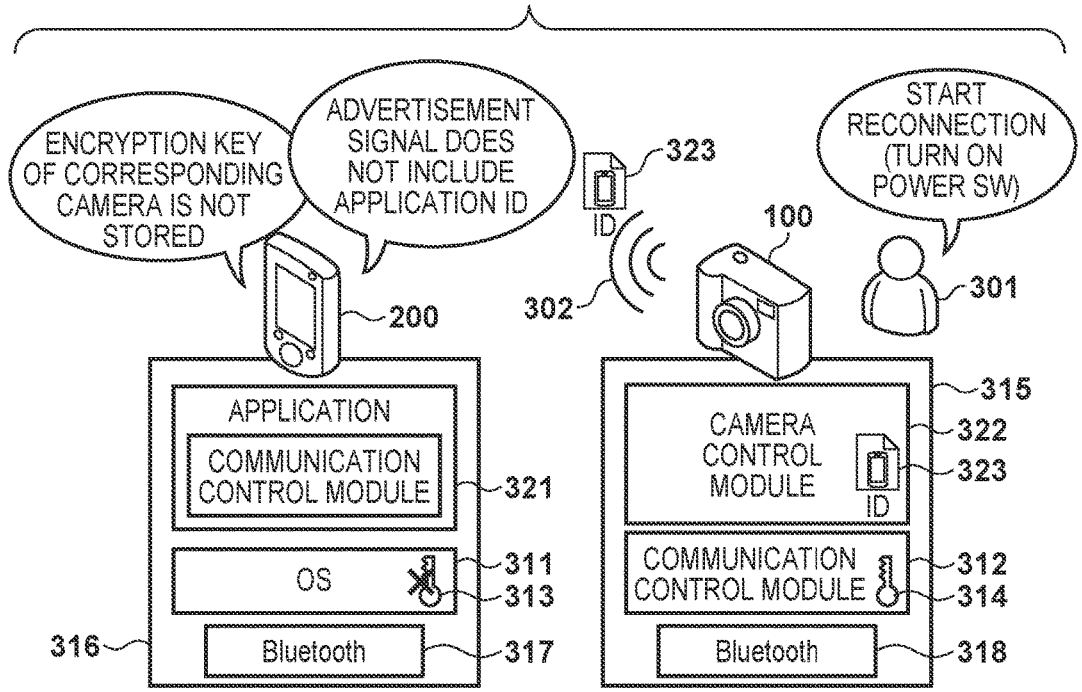
FIGS. 11A and 11B are diagrams schematically showing a procedure for detecting an inconsistency in the registration state according to a second embodiment.
Figure 11B:
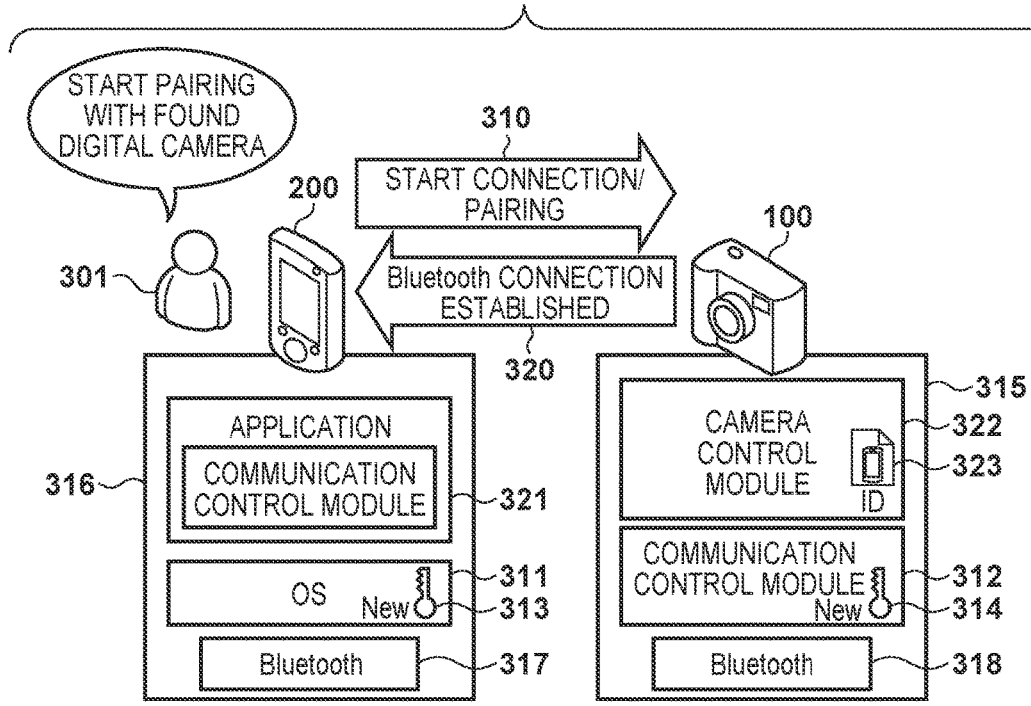

FIGS. 11A and 11B schematically show operations according to the present embodiment for solving the problem described with reference to FIGS. 10A to 10C.

FIG. 11A shows a state as in FIG. 10B in which an advertisement signal 302 is broadcast from the digital camera 100 in response to the user 301 performing an operation for establishing a reconnection with the smartphone 200 in the digital camera 100 (for example, turning the power switch of the digital camera 100 on again). The broadcast advertisement signal 302 includes the ID 323 of the application 321 of the smartphone 200 that has been identified as a paired device in the digital camera 100. In the smartphone 200, on the other hand, the encryption key 313 associated with the digital camera 100 has been deleted from the data of the OS 311.

The control unit 201 (the application 321) of the smartphone 200 detects that the ID 323 of the application 321 of the smartphone 200 is included in the advertisement signal 302 and that the transmission source from which the advertisement signal 302 was transmitted is the digital camera 100. Then, the control unit 201 (the application 321) confirms whether or not the encryption key 313 associated with the digital camera 100 is stored as the data of the OS 311 (whether or not the digital camera 100 is a paired device).

Figure 9D:
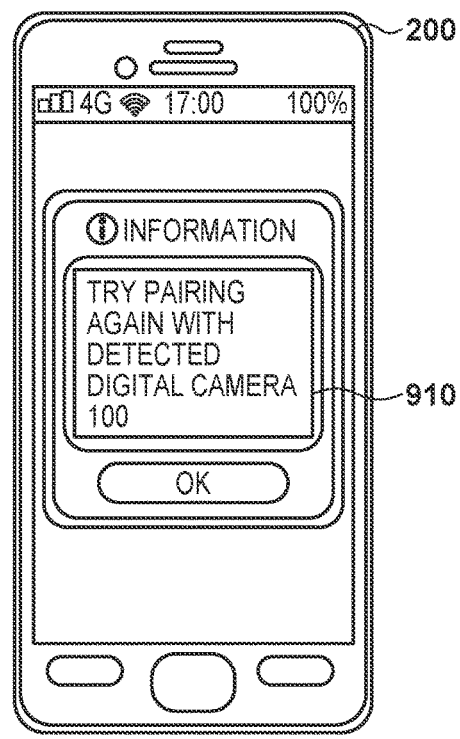

If it is determined that the encryption key 313 is not stored (the digital camera 100 is not a paired device), the control unit 201 (the application 321) displays a screen that prompts the user to again try pairing with the digital camera 100. FIG. 9D shows an example of a screen 910 that prompts the user to try pairing again.

Then, the user can become aware of the fact that the digital camera 100 is not identified as a paired device in the smartphone 200 and re-establish the pairing with the digital camera 100 (FIG. 11B). Accordingly, it is possible to avoid a situation in which the user repeatedly performs an operation for establishing a connection with the smartphone 200 in the digital camera 100 without knowing the cause of the communication failure.

Flowchart of Connection Processing of Smartphone 200

Figure 12:
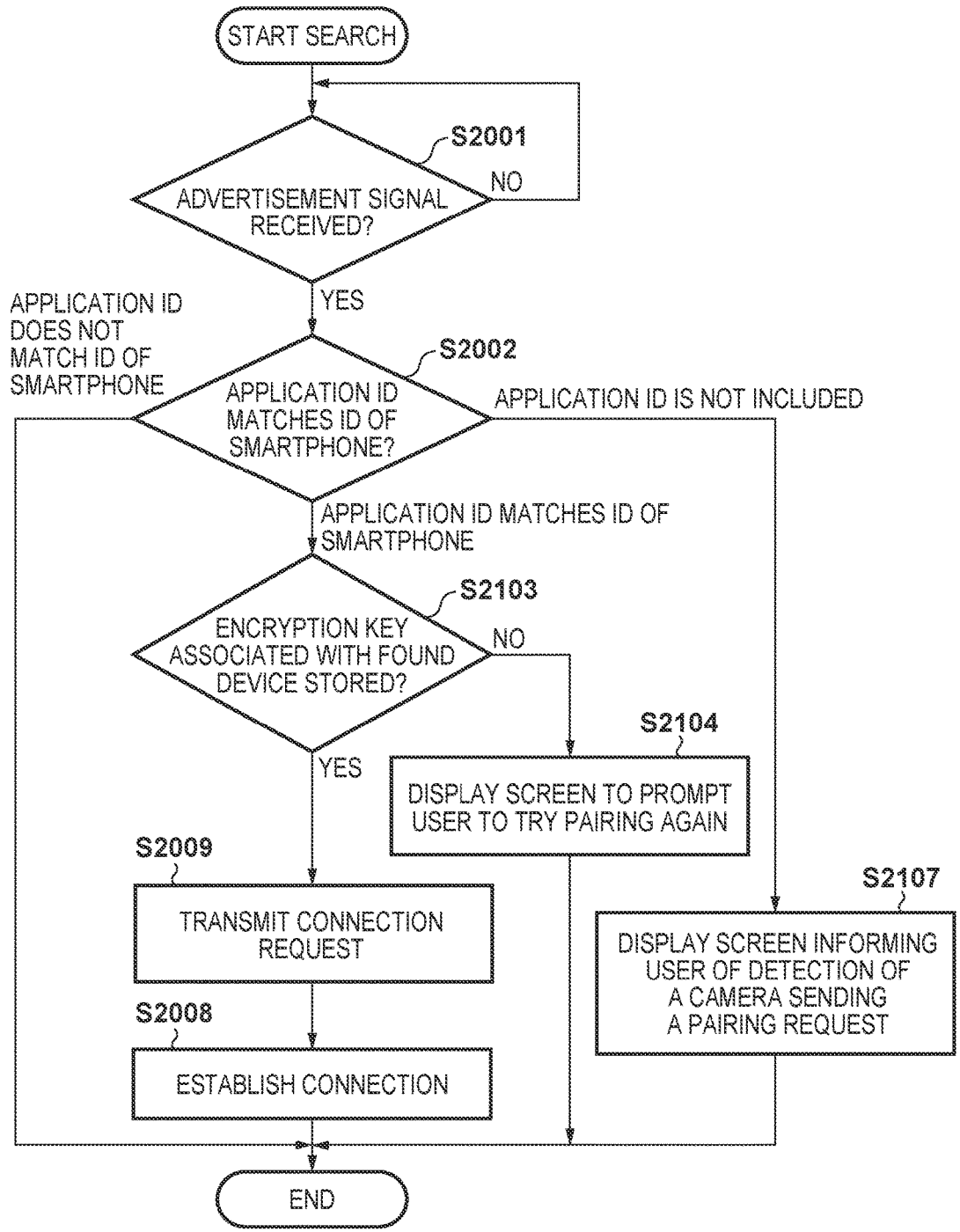
FIG. 12 is a flowchart illustrating the operations of the smartphone 200 according to the second embodiment.

FIG. 12 is a flowchart illustrating connection processing of the smartphone 200 according to the present embodiment. The same reference numerals are given to the steps in which operations that are the same as those of the first embodiment are performed, and thus a redundant description will be omitted. The connection processing of the digital camera 100 can be performed in the same manner as that of the first embodiment described with reference to FIGS. 7A and 7B.

In step S2002, the processing performed if it is determined that the advertisement signal includes an ID different from the ID of the application 321 of the smartphone 200 is the same as that of the first embodiment. If it is determined that the advertisement signal does not include an application ID, the control unit 201 (the application 321) causes the processing to proceed to step S2107, displays a screen that informs the user of the fact that a camera sending a pairing request has been detected, and then ends the processing. Instead of causing the processing to proceed to step S2107, the processing in step S2003 and the subsequent steps of the first embodiment may be performed. In this case, in the first embodiment, pairing is automatically executed if it is determined that the encryption key associated with the transmission source device from which the advertisement signal was transmitted is not stored (NO in step S2003), but it is also possible to perform the processing of step S2107 so as to allow the user to determine whether or not to permit pairing.

If it is determined that the advertisement signal includes the ID 323 of the application 321 of the smartphone 200, the control unit 201 (the application 321) determines that the transmission source device from which the advertisement signal was transmitted is a paired device, and causes the processing to proceed to step S2103.

In step S2103, the control unit 201 (the application 321) confirms whether or not the encryption key 313 associated with the transmission source device from which the advertisement signal was transmitted (here, the digital camera 100) is stored as the data of the OS 311. The control unit 201 (the application 321) causes the processing to proceed to step S2104 if it is determined that the encryption key 313 is not stored, and otherwise executes the processing of steps S2009 and S2008, and ends the processing.

In step S2104, the control unit 201 (the application 321) displays a screen as shown in FIG. 9D that prompts the user to try pairing with the digital camera 100 again, and ends the processing.

As described above, according to the present embodiment as well, it is possible to detect an inconsistency in the registration state between the transmission source device from which the advertisement signal was transmitted and the smartphone 200 based on the content of the received advertisement signal and the stored information of the transmission source device from which the advertisement signal was transmitted. Accordingly, it is possible to avoid a communication failure and a failure in re-registration processing caused by the inconsistency in the registration state.

Other Embodiments

In the first embodiment, processing in step S2103 and the subsequent steps according to the second embodiment may be performed instead of step S2009 if it is determined that the advertisement signal includes the ID of the application installed in the smartphone 200.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-164060, filed on Aug. 24, 2016, which is hereby incorporated by reference herein in its entirety.

What is claimed is:

1. A wireless communication device comprising:
a processor; and
a memory that stores a program executable by the processor, wherein the program causes, when executed by the processor, the processor to function as:
a storage unit configured to store, when registering an external device as a communication partner, an encryption key to be used in communications with the external device in association with the external device;
a determining unit configured to, if a search signal from an external device received through wireless communication does not include unique information for identifying a searched device being searched by the search signal, determine whether or not the external device has been registered as a communication partner by confirming whether the encryption key associated with the external device is stored in the storage unit or not using identification information of the external device included in the search signal; and
a cancellation unit configured to cancel registration of the external device if it is determined by the determining unit that the external device has been registered as a communication partner.

2. The wireless communication device according to claim 1,
wherein the determining unit is configured to also determine whether or not the external device has been registered as a communication partner if the search signal includes the unique information for identifying the wireless communication device, and
the program further causes, when executed by the processor, the processor to function as an informing unit configured to prompt a user to again perform processing of registering the external device as a communication partner in a case where the search signal includes the unique information for identifying the wireless communication device and it is determined by the determination unit that the external device has not been registered as a communication partner.

3. The wireless communication device according to claim 1,
wherein after cancellation of the registration of the external device, the program causes the processor to start processing of registering the external device as a communication partner by transmitting a connection request signal to the external device through wireless communication.

4. The wireless communication device according to claim 1,
wherein cancellation of the registration of the external device is deletion of the encryption key associated with the external device from the storage unit.

5. A wireless communication device comprising:
a processor; and
a memory that stores a program being executable by the processor, wherein the program causes, when executed by the processor, the processor to function as:
a storage unit configured to store, when registering an external device as a communication partner, an encryption key to be used in communications with the external device in association with the external device;
a determining unit configured to, if a search signal from an external device received through wireless communication includes unique information for identifying the wireless communication device, determine whether or not the external device has been registered as a communication partner by confirming whether the encryption key associated with the external device is stored in the storage unit or not using identification information of the external device included in the search signal; and
an informing unit configured to prompt a user to again perform processing of registering the external device as a communication partner if it is determined by the determining unit that the external device has not been registered as a communication partner.

6. The wireless communication device according to claim 5,
wherein the determining unit is configured to also determine whether or not the external device has been registered as a communication partner if the search signal does not include the unique information for identifying a searched device being searched by the search signal, and
the program further causes, when executed by the processor, the processor to function as a cancellation unit configured to cancel registration of the external device in a case where the search signal does not include the unique information for identifying the searched device and it is determined by the determining unit that the external device has been registered as a communication partner.

7. The wireless communication device according to claim 6,
wherein after cancellation of the registration of the external device, the program causes the processor to start processing of registering the external device as a communication partner by transmitting a connection request signal to the external device through wireless communication.

8. The wireless communication device according to claim 6,
wherein cancellation of the registration of the external device is deletion of the encryption key associated with the external device from the storage unit.

9. A wireless communication system comprising:
a wireless communication device; and
an electronic device configured to transmit a search signal, wherein the wireless communication device comprises:
a processor; and
a memory that stores a program being executable by the processor, wherein the program causes, when executed by the processor, the processor to function as:
a storage unit configured to store, when registering an external device as a communication partner, an encryption key to be used in communications with the external device in association with the external device;
a determining unit configured to, if the search signal from the external device received through wireless communication does not include unique information for identifying a searched device being searched by the search signal, determine whether or not the external device has been registered as a communication partner by confirming whether the encryption key associated with the external device is stored in the storage unit or not using identification information of the external device included in the search signal; and
a cancellation unit configured to cancel registration of the external device if it is determined by the determining unit that the external device has been registered as a communication partner, and
wherein the electronic device is configured to, if there is an external device that has been registered as a communication partner, transmit the search signal by incorporating unique information for identifying the external device in the search signal, and if there is no external device that has been registered as a communication partner, transmit the search signal without incorporating the unique information for identifying the external device in the search signal.

10. A wireless communication system comprising:
a wireless communication device; and
an electronic device configured to transmit a search signal,
wherein the wireless communication device comprises:
a processor; and
a memory that stores a program being executable by the processor, wherein the program causes, when executed by the processor, the processor to function as:
a storage unit configured to store, when registering an external device as a communication partner, an encryption key to be used in communications with the external device in association with the external device;
a determining unit configured to, if the search signal from the external device received through wireless communication includes unique information for identifying the wireless communication device, determine whether or not the external device has been registered as a communication partner by confirming whether the encryption key associated with the external device is stored in the storage unit or not using identification information of the external device included in the search signal; and
an informing unit configured to prompt a user to again perform processing of registering the external device as a communication partner if it is determined by the determining unit that the external device has not been registered as a communication partner, and wherein the electronic device is configured to, if there is an external device that has been registered as a communication partner, transmit the search signal by incorporating unique information for identifying the external device in the search signal, and if there is no external device that has been registered as a communication partner, transmit the search signal without incorporating the unique information for identifying the external device in the search signal.

11. A method for controlling a wireless communication device executed by a processor included in the wireless communication device, the method comprising:
storing, when registering an external device as a communication partner, an encryption key to be used in communications with the external device in association with the external device in a storage unit;
receiving a search signal from an external device received through wireless communication;
determining whether or not the search signal includes unique information for identifying a searched device being searched by the search signal;
determining whether or not the external device has been registered as a communication partner if it is determined in the determining that the search signal does not include the unique information, by confirming whether the encryption key associated with the external device is stored in the storage unit or not using identification information of the external device included in the search signal; and
cancelling registration of the external device if it is determined in the determining that the external device has been registered as a communication partner.

12. A method for controlling a wireless communication device executed by a processor included in the wireless communication device, the method comprising:
storing, when registering an external device as a communication partner, an encryption key to be used in communications with the external device in association with the external device in a storage unit;
first determining whether or not a search signal from an external device received through wireless communication includes unique information for identifying the wireless communication device;
second determining whether or not the external device has been registered as a communication partner if it is determined in the first determining that the search signal includes the unique information, by confirming whether the encryption key associated with the external device is stored in the storage unit or not using identification information of the external device included in the search signal; and
prompting a user to again perform processing of registering the external device as a communication partner if it is determined in the second determining that the external device has not been registered as a communication partner.

13. A non-transitory computer-readable medium storing a program for causing a computer included in a wireless communication device to function as:
a storage unit configured to store, when registering an external device as a communication partner, an encryption key to be used in communications with the external device in association with the external device;
a determining unit configured to, if a search signal from an external device received through wireless communication does not include unique information for identifying a searched device being searched by the search signal, determine whether or not the external device has been registered as a communication partner by confirming whether the encryption key associated with the external device is stored in the storage unit or not using identification information of the external device included in the search signal; and a cancellation unit configured to cancel registration of the external device if it is determined by the determining unit that the external device has been registered as a communication partner.

14. A non-transitory computer-readable medium storing a program for causing a computer included in a wireless communication device to function as:

a storage unit configured to store, when registering an external device as a communication partner, an encryption key to be used in communications with the external device in association with the external device;

a determining unit configured to, if a search signal from an external device received through wireless communication includes unique information for identifying the wireless communication device, determine whether or not the external device has been registered as a communication partner by confirming whether the encryption key associated with the external device is stored in the storage unit or not using identification information of the external device included in the search signal; and an informing unit configured to prompt a user to again perform processing of registering the external device as a communication partner if it is determined by the determining unit that the external device has not been registered as a communication partner.

* * * * *